(12) United States Patent
Masuda

(10) Patent No.: US 9,229,614 B2
(45) Date of Patent: Jan. 5, 2016

(54) STORAGE MEDIUM STORING INFORMATION PROCESSING PROGRAM, INFORMATION PROCESSING DEVICE, INFORMATION PROCESSING SYSTEM, AND METHOD FOR CALCULATING SPECIFIED POSITION

(71) Applicant: NINTENDO CO., LTD., Kyoto (JP)

(72) Inventor: Naoki Masuda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 49 days.

(21) Appl. No.: 14/073,276

(22) Filed: Nov. 6, 2013

(65) Prior Publication Data
US 2014/0375560 A1    Dec. 25, 2014

(30) Foreign Application Priority Data
Jun. 25, 2013  (JP) .................................. 2013-132846

(51) Int. Cl.
| *G06F 3/033* | (2013.01) |
| *G06F 3/041* | (2006.01) |
| *G06F 3/0481* | (2013.01) |
| *G06F 3/0488* | (2013.01) |
| *G06F 3/038* | (2013.01) |

(52) U.S. Cl.
CPC .......... *G06F 3/04815* (2013.01); *G06F 3/0383* (2013.01); *G06F 3/041* (2013.01); *G06F 3/0488* (2013.01)

(58) Field of Classification Search
None
See application file for complete search history.

(56) References Cited

U.S. PATENT DOCUMENTS

| 8,277,316 | B2 | 10/2012 | Haigh-Hutchinson | |
| 2007/0097114 | A1* | 5/2007 | Kim et al. | 345/419 |
| 2010/0306717 | A1* | 12/2010 | Yamada et al. | 715/863 |

FOREIGN PATENT DOCUMENTS

JP    2008-68060    3/2008

* cited by examiner

*Primary Examiner* — Nicholas Lee
(74) *Attorney, Agent, or Firm* — Nixon & Vanderhye PC

(57) ABSTRACT

An example information processing device calculates a specified position Ps2 in a three-dimensional virtual space displayed on a screen of a display device. The information processing device calculates a two-dimensional input position Pi2 on the screen based on an input of a user. The specified position Ps2 is calculated based on the input position Pi2. The information processing device calculates, as the specified position Ps2, a three-dimensional position that satisfies a distance condition and also satisfies a range condition. The distance condition is a condition regarding the distance from a predetermined reference position in the virtual space. The range condition is a condition that an on-screen position corresponding to the three-dimensional position be within a range determined by the on-screen position corresponding to the reference position and the input position Pi2.

17 Claims, 7 Drawing Sheets

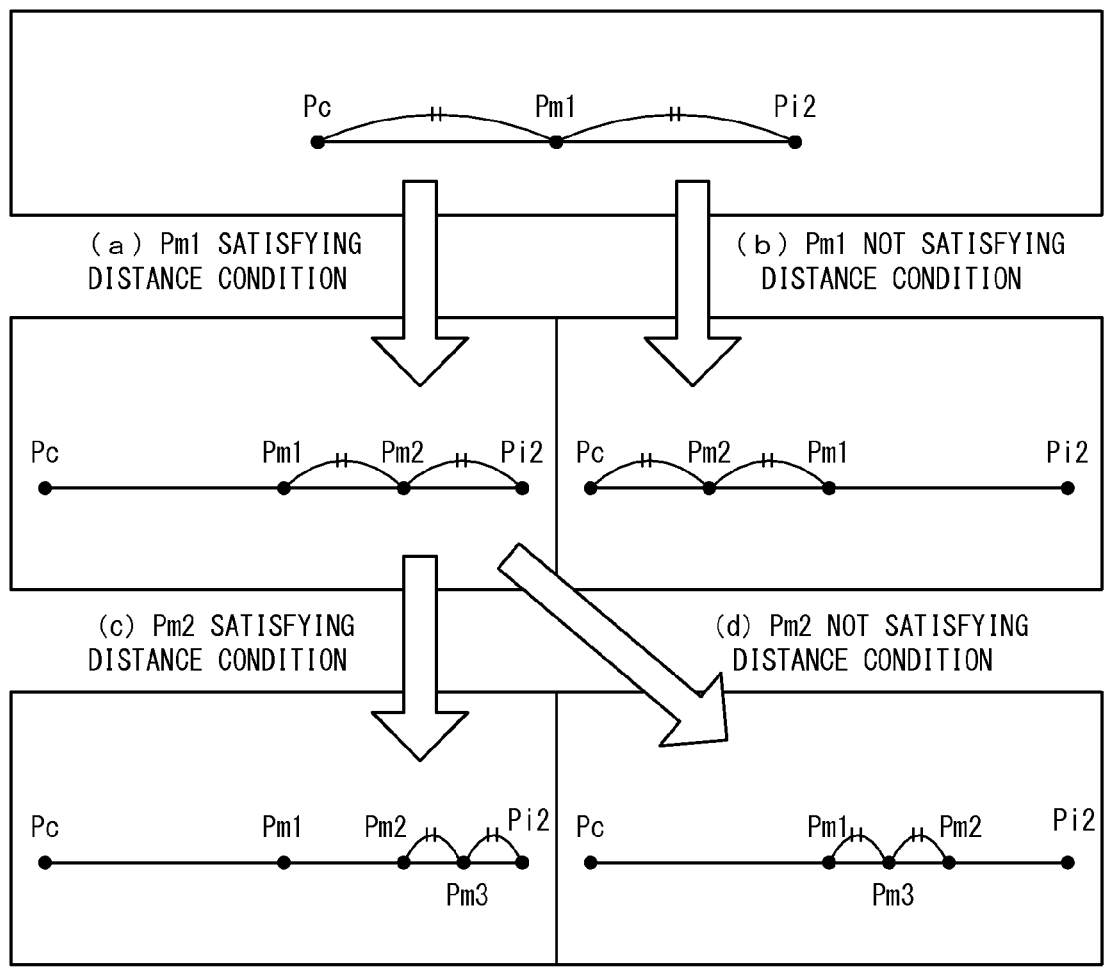
F I G. 7

F I G. 1 0
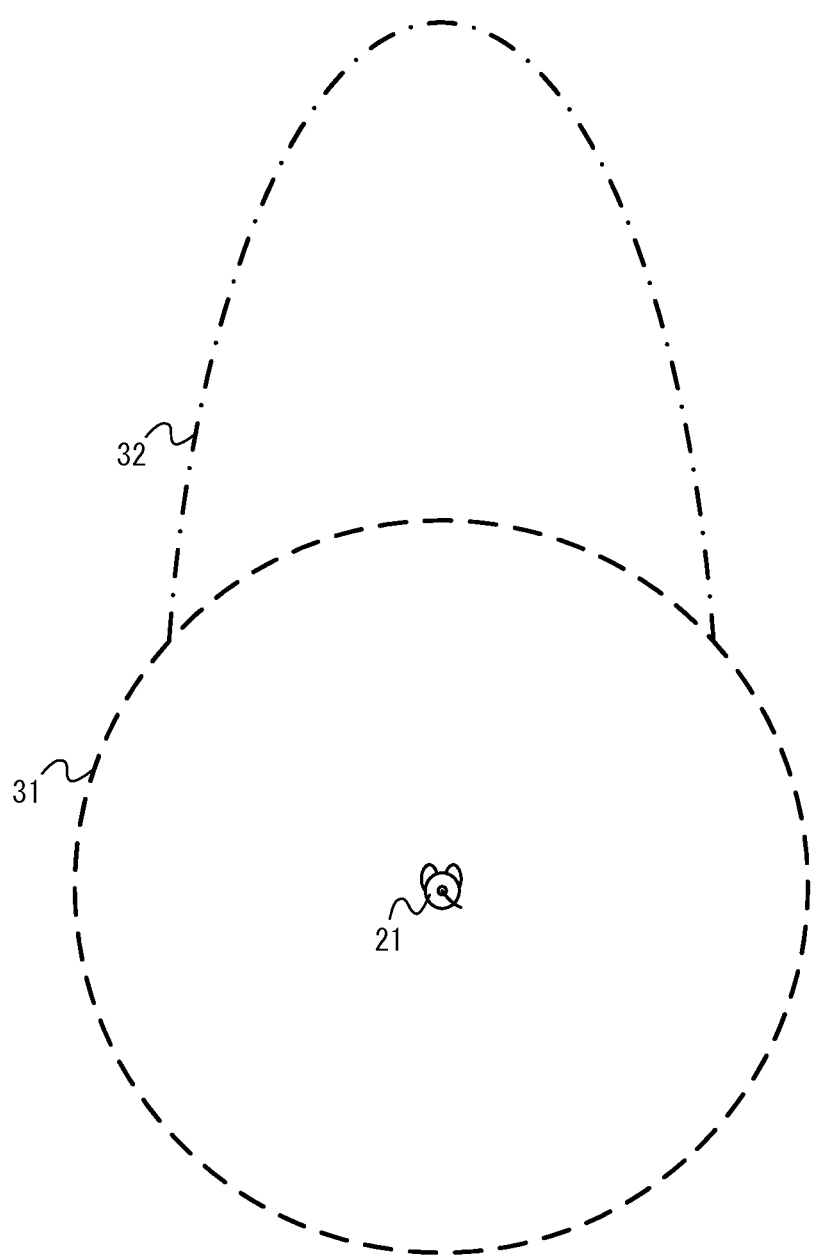

STORAGE MEDIUM STORING INFORMATION PROCESSING PROGRAM, INFORMATION PROCESSING DEVICE, INFORMATION PROCESSING SYSTEM, AND METHOD FOR CALCULATING SPECIFIED POSITION

CROSS REFERENCE TO RELATED APPLICATION

The disclosure of Japanese Patent Application No. 2013-132846 filed on Jun. 25, 2013 is herein incorporated by reference.

FIELD

The technology herein relates to a storage medium storing an information processing program, an information processing device, an information processing system, and a method for calculating a specified position for calculating a specified position in a three-dimensional virtual space displayed on a screen of a display device.

BACKGROUND AND SUMMARY

There are conventional techniques for moving a cursor (pointer) on the screen using an input device such as a stick, and specifying, with the cursor, a position in the virtual space displayed on the screen.

There are cases where only by simply moving the cursor in a direction specified with the input device, the user cannot comfortably perform the operation of moving the specified position (the position of the cursor).

Thus, the present specification discloses a storage medium storing an information processing program, an information processing device, an information processing system, and a method for calculating a specified position capable of improving the controllability in the operation of specifying a specified position.

(1)

An example storage medium is a computer-readable non-transitory storage medium storing an information processing program to be executed by a computer of an information processing device for calculating a specified position in a three-dimensional virtual space displayed on a screen of a display device. The information processing program causes the computer to execute: calculating an input position; and calculating the specified position.

The computer calculates a two-dimensional input position on the screen based on an input of a user.

The computer calculates, as the specified position, based on the input position, a three-dimensional position satisfying a distance condition regarding a distance from a predetermined reference position in the virtual space, wherein the three-dimensional position satisfies a range condition that an on-screen position corresponding to the three-dimensional position be within a range determined by an on-screen position corresponding to the reference position and the input position.

The term "on-screen position" as used herein refers to a position on the two-dimensional display screen, as opposed to the term "virtual-space position", which as used herein refers to a position in a three-dimensional virtual space.

With configuration (1) above, since the specified position is calculated so that the distance condition is satisfied, it is possible to limit the range on the screen in which the specified position can be assumed. Thus, it is possible to improve the controllability in the operation of specifying the specified position. Since the specified position is calculated so that the range condition is satisfied, the specified position can be determined reflecting the input position of the user. This also improves the controllability in the operation of specifying the specified position.

(2)

The computer may calculate the specified position using, as the range condition, a condition that an on-screen position corresponding to the specified position be within a predetermined range between the on-screen position corresponding to the reference position and the input position.

With configuration (2) above, since the specified position is within the range between the reference position and the input position on the screen, the direction of the input position is generally equal to the direction of the specified position as seen from the reference position. Therefore, the user is unlikely to feel awkward even if the input position and the specified position are not the same position on the screen, and it is thus possible to provide a control method with a good controllability.

(3)

The specified position may calculate the specified position using, as the range condition, a condition that the on-screen position corresponding to the specified position be located on a line segment connecting between the on-screen position corresponding to the reference position and the input position.

With configuration (3) above, it is possible to easily calculate the specified position from the line segment. Moreover, the direction of the input position and the direction of the specified position as seen from the reference position can be made equal to each other, and it is thus possible to provide a control method with a good controllability.

(4)

The computer may calculate the specified position using, as the distance condition, a condition that the specified position be within a predetermined distance from the reference position in the virtual space.

With configuration (4) above, the range in which the specified position can be assumed can be easily limited to a range within a predetermined distance from the reference position.

(5)

The computer may calculate the specified position using, as the distance condition, a condition that a distance of the specified position regarding a predetermined plane in the virtual space be within a predetermined distance from the reference position.

With configuration (5) above, the specified position can be a position of which the distance is short with respect to a predetermined plane and is long with respect to a direction perpendicular to the predetermined plane, for example. Thus, with configuration (5) above, the range in which the specified position can be assumed can be set to an appropriate range for the application of the specified position by appropriately setting the predetermined plane.

(6)

The computer may calculate the specified position so that an on-screen position corresponding to the specified position is within a predetermined limit area on the screen.

With configuration (6) above, the range in which the specified position can be assumed can be limited by a method different from the method using the distance condition. Therefore, circumstances are less likely to occur where the specified position needs to be moved significantly, and it is thus possible to better improve the controllability in the operation of specifying the specified position.

(7)

The information processing device may obtain input information from a direction input device. The computer may calculate a new input position based on the input information so that the input position is obtained by moving a position of a lastly-calculated specified position on the screen in a direction represented by the input information. The computer may calculate a new specified position based on the new input position.

With configuration (7) above, the new input position is a position obtained by moving the previous specified position in an input direction specified by the user. Thus, it is possible to calculate the input position such that the position is easy to understand for the user.

(8)

The computer calculates one or more positions satisfying the range condition on the screen are calculated as candidate positions based on the input position. The computer determines a virtual-space position corresponding to one of the candidate positions satisfying the distance condition as the specified position.

With configuration (8) above, by calculating candidate positions and determining the range condition and the distance condition for the candidate positions, it is possible to easily calculate the specified position satisfying the range condition and the distance condition.

(9)

The computer may determine a virtual-space position corresponding to one of the candidate positions satisfying the distance condition that is farthest away from the reference position as the specified position.

With configuration (9) above, the specified position is one of the candidate positions that is closest to the input position. Then, since the difference between the direction specified by the user and the direction in which the specified position moves can be kept small, it is possible to provide a control method with a good controllability, with which the user is unlikely to feel awkward.

(10)

The computer may repeatedly calculate candidate positions until a predetermined condition is satisfied by using a binary search method on the reference position and the input position on the screen. Then, it may be determined whether the distance condition is satisfied each time a candidate position is calculated, and the specified position may be determined from the candidate positions satisfying the distance condition.

With configuration (10) above, by calculating the candidate positions using a binary search method, it is possible to efficiently determine candidate positions, and it is possible to efficiently perform the specified position calculation process.

(11)

The computer may determine, as the specified position, one of the three-dimensional positions satisfying the range condition that satisfies the distance condition and is in the vicinity of a position farthest away from the reference position in terms of a distance on the screen.

With configuration (11) above, the specified position is one of the positions satisfying the range condition and the distance condition that is closest to the input position on the screen. Then, since the difference between the direction specified by the user and the direction in which the specified position moves can be kept small, it is possible to provide a control method with a good controllability, with which the user is unlikely to feel awkward.

(12)

The computer may calculate the specified position by using, as the distance condition, a condition that an on-screen position corresponding to the specified position be within a predetermined area set with respect to the on-screen position corresponding to the reference position or that the specified position be within a predetermined distance from the reference position in the virtual space.

With configuration (12) above, for the range within the predetermined area, any position can be specified as the specified position, irrespective of the distance in the virtual space. Thus, it is possible to further improve the controllability in the operation of moving the specified position.

(13)

The computer may determine, as the specified position, one of positions in the virtual space that is displayed on the screen.

With configuration (13) above, the specified position is a position at which a straight line extending from the position of the viewpoint hits an object in the virtual space. Then, the specified position is a position displayed on the screen, and it is possible to display the specified position in an easy-to-understand manner for the user without the specified position being hidden by the object arranged in the virtual space.

Note that the present specification also discloses a information processing device and an information processing system for performing various processes equivalent to those realized by executing the information processing program in the configurations (1) to (13) above, and the present specification also discloses a method for calculating a specified position to be carried out in (1) to (13) above.

With the storage medium storing an information processing program, the information processing device, the information processing system and the method for calculating a specified position, the specified position is calculated so that the distance condition and the range condition are satisfied, thereby improving the controllability in the operation of specifying the specified position.

These and other objects, features, aspects and advantages will become more apparent from the following detailed description when taken in conjunction with the accompanying drawings.

BRIEF DESCRIPTION OF THE DRAWINGS

FIG. 7 is a diagram showing an example of a method for determining a candidate position;

FIG. 10 is a diagram showing the area and the valid area shown in FIG. 9 as seen from directly above.

DETAILED DESCRIPTION OF NON-LIMITING EXAMPLE EMBODIMENTS

[1. Configuration of Information Processing System]

Figure 1:
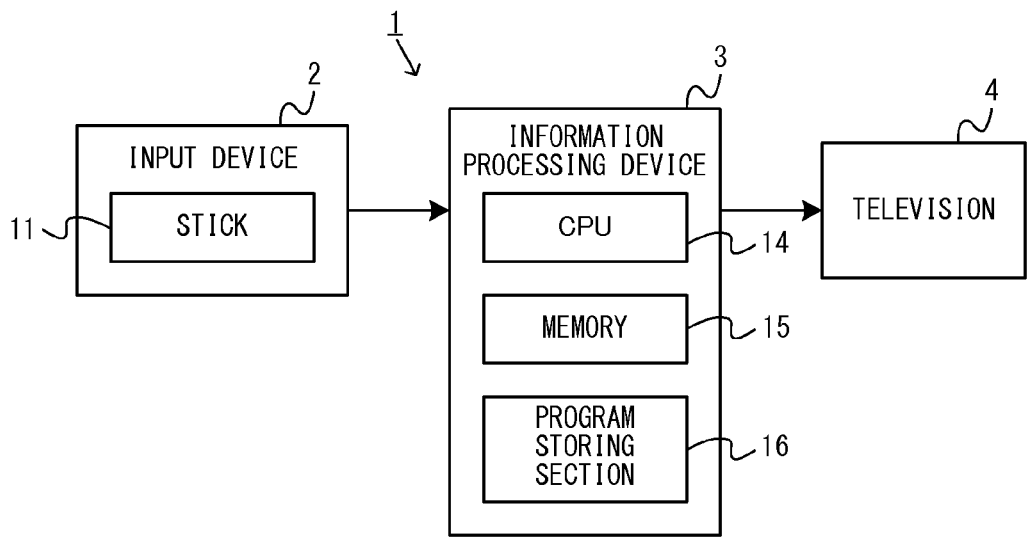
FIG. 1 is a block diagram showing a non-limiting example information processing system according to the present embodiment.

A storage medium storing an information processing program, an information processing system, an information processing device, and a method for performing information processes according to an example of the present embodiment will now be described. FIG. 1 is a block diagram showing an example of an information processing system according to the present embodiment. In FIG. 1, an information processing system 1 includes an input device 2, an information processing device 3, and a television 4. The information processing system 1 of the present embodiment calculates a specified position specified by the user using the input device 2 in a three-dimensional virtual space displayed on the screen of the television 4.

The information processing system 1 includes an input device (controller) 2 with which the user makes an input. In the present embodiment, the input device 2 includes a stick 11. The stick 11 is an example of a direction input device with which at least the direction can be input. In the present embodiment, the stick 11 can be tilted from the reference position in any up, down, left and right direction (any direction from 0° to 360°), and outputs values in accordance with the direction of tilt and the amount (angle) of tilt from the reference position. Specifically, the output value of the stick 11 is a two-dimensional coordinate value representing the direction of tilt and the amount of tilt.

Note that the direction input device of the input device 2 may be a slide pad, a cross-shaped key, or a pointing device (a mouse, or the like), other than the stick 11. The input device 2 may include, in addition to (or instead of) the direction input device, another type of an input device such as a button, a sensor (a gyrosensor, or the like) capable of detecting the attitude of the input device 2, and/or a touch panel.

The input device 2 detects an operation of the user, and transmits to the information processing device 3 operation data representing the operation of the user. In the present embodiment, the operation data includes data of the output value of the stick 11.

The information processing system 1 includes the information processing device 3. The information processing device 3 performs an information process (the specified position calculation process to be described later) performed by the information processing system 1. The information processing device 3 may be any form of an information processing device, such as a personal computer, a game device, a portable terminal, a smart phone, or the like. The information processing device 3 is capable of communicating with the input device 2 and the television 4. Note that the communication between the information processing device 3 and the input device 2 or the television 4 may be wired or wireless.

As shown in FIG. 1, the information processing device 3 includes a CPU 14, a memory 15, and a program storing section 16. The CPU 14 performs the information process by performing executing a predetermined information processing program using the memory 15. The information process of the present embodiment is a control position calculation operation for calculating the specified position based on the operation data, details of which will be described later. Note that the specified position is a position in the virtual space displayed on the television 4 that is controlled by the user. The information processing device 3 may have any configuration capable of performing the information process, and part or whole of the information process may be performed by a dedicated circuit, for example. In the present embodiment, the information processing device 3 generates an image through the information process described above, and the generated image is output from the information processing device 3 to the television 4.

The program storing section 16 stores the information processing program. The program storing section 16 may be any storage device (storage medium) accessible by the CPU 14. The program storing section 16 may be a storage section provided in the information processing device 3, e.g., a hard disk, for example, or a storage medium attachable/removable to/from the information processing device 3, e.g., an optical disc, for example.

The television 4 is an example of a display device for displaying an image. When an image is transmitted from the information processing device 3 to the television 4, the television 4 displays the image.

In the information processing system 1, the information processing device 3 performs the information process based on an input made on the input device 2, and an image obtained as a result of the information process is displayed on the television 4. Thus, in the present embodiment, the information processing system 1 has a configuration such that the input function, the information processing function and the display function are realized by a plurality of devices. Note that in other embodiments, more than one of these functions may be realized by a single information processing device. For example, the information processing system 1 may include a single information processing device (e.g., a portable information processing terminal) having the input function and the information processing function, instead of the input device 2 and the information processing device 3.

In other embodiments, the information process performed by the information processing device 3 may be performed by a plurality of devices. For example, in other embodiments, at least part of the information process performed by the information processing device 3 may be distributed among a plurality of devices capable of communicating with one another by a network (a wide area network and/or a local network).

[2. Outline of Process of the Present Embodiment]

The outline of the information process performed by the present embodiment will now be described. In the present embodiment, the information processing system 1 performs an information process of calculating (controlling) the specified position in the virtual space based on the input of the user. Herein, the present embodiment is directed to a case where the specified position is used in game operations. That is, the present embodiment is directed to a case where a virtual game space is displayed on the television 4, and the specified position is calculated in the game space.

(2-1: Outline of Game Image)

Figure 2:
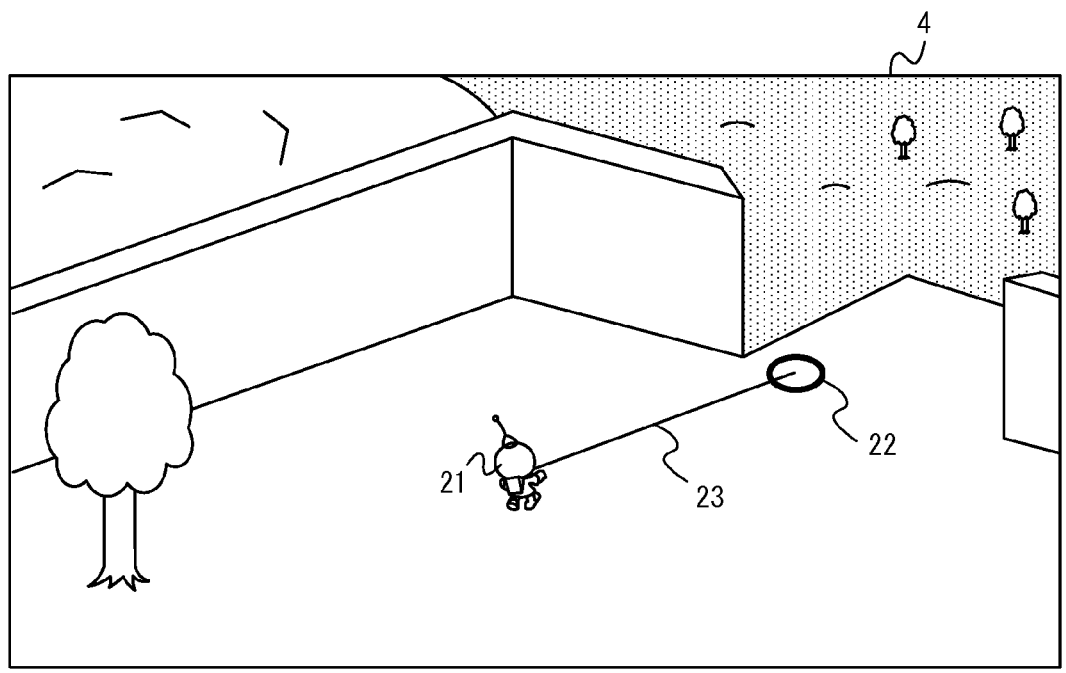
FIG. 2 is a diagram showing an example of a game image displayed on the screen of the television.

FIG. 2 is a diagram showing an example of a game image displayed on the screen of the television 4. As shown in FIG. 2, a virtual space (game space) in which a player character 21 to be controlled by the user is arranged is displayed on the screen. In the present embodiment, the player character 21 is displayed at a predetermined position on the screen (specifically, at a position slightly below the center of the screen). As shown in FIG. 2, a pointer image 22 is displayed in the virtual space. The pointer image 22 represents the specified position. Moreover, in the present embodiment, a line 23 is displayed, which extends from the player character 21 to the specified position. In response to an operation on the stick 11, the pointer image 22 moves and the line 23 changes, details of which will be described later. Note that while images representing the specified position (the pointer image 22 and the line 23) are displayed in the present embodiment, the images representing the specified position do not need to be displayed in other embodiments.

In response to a predetermined action command from the user, a predetermined process (game operation) is performed against the specified position. For example, in response to the action command, the information processing system 1 makes the player character 21 execute an attack action against the specified position, or move another character (a teammate character, etc.) to the specified position.

(2-2: Outline of Control of Specified Position)

Figure 3:
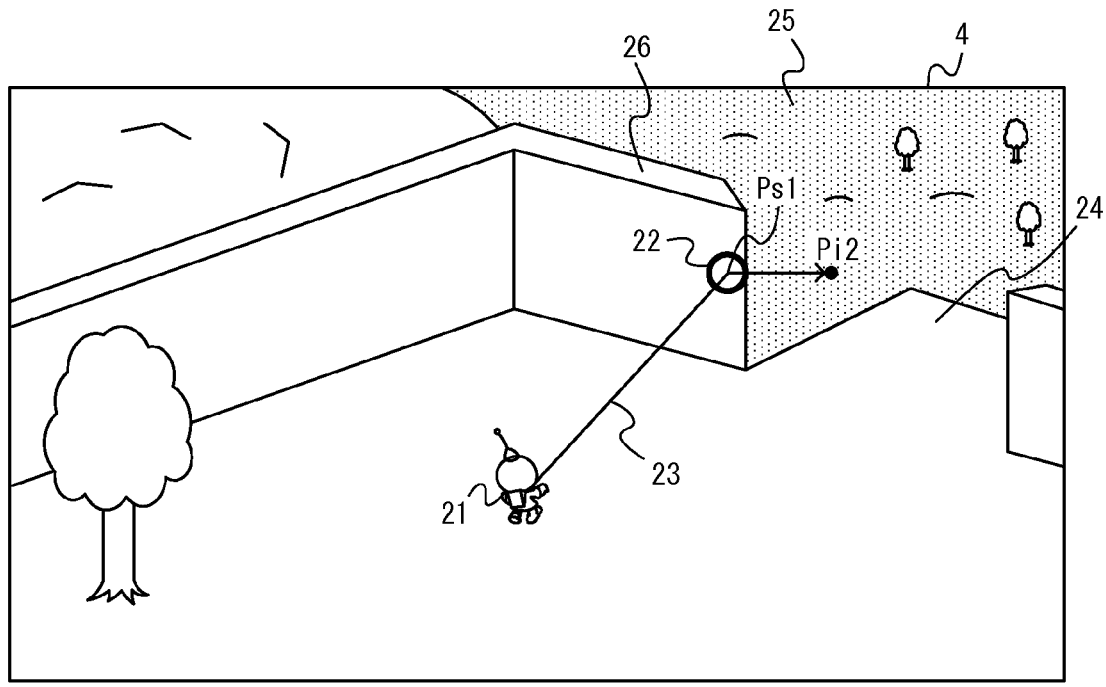
FIG. 3 is a diagram showing an example of a game image in the state before the specified position is moved.

Next, referring to FIGS. 3 and 4, the outline of a method for moving the specified position in response to an input of the user will be described. FIG. 3 is a diagram showing an example of a game image in the state before the specified position is moved. In the state shown in FIG. 3, the specified position Ps1 is on a wall 26 arranged in the virtual space. A case will be described below where an input specifying the right direction (specifically, an input of tilting the stick 11 to the right) is made.

An input specifying a direction is made on the input device 2 (the stick 11), the information processing system 1 calculates the shown in input position (the position Pi2 shown in FIG. 3) based on the input. The input position is calculated as a position on the screen. That is, the input position is represented by two-dimensional coordinates indicating a position on the screen. Note that any method may be used for calculating the input position based on an input of the user. In the present embodiment, the input position Pi2 is calculated as a position obtained by moving the on-screen position corresponding to the specified position Ps1 before being moved (before the input) based on the distance and the direction in accordance with the input. Specifically, the input position Pi2 is a position obtained by moving the specified position Ps1 on the screen in the direction in accordance with the direction of tilt of the stick 11 by an amount in accordance with the amount of tilt of the stick 11. Since an input specifying the right direction is made in the example shown in FIG. 3, the input position Pi2 is a position obtained by moving the specified position Ps1 before the input in the right direction on the screen. Thus, in the present embodiment, the calculation (control) of the input position is performed in a two-dimensional plane corresponding to the screen.

Note that in the virtual space shown in FIG. 3, a platform 24 is projecting from between walls in front of the player character 21, and there is a cliff beyond the platform 24. Therefore, on the screen, a ground 25 very distant from the player character 21 is displayed beyond the platform 24. In the example shown in FIG. 3, the input position Pi2 is pointing at the ground 25. That is, a virtual-space position corresponding to the input position Pi2 is a position on the ground 25.

Figure 4:
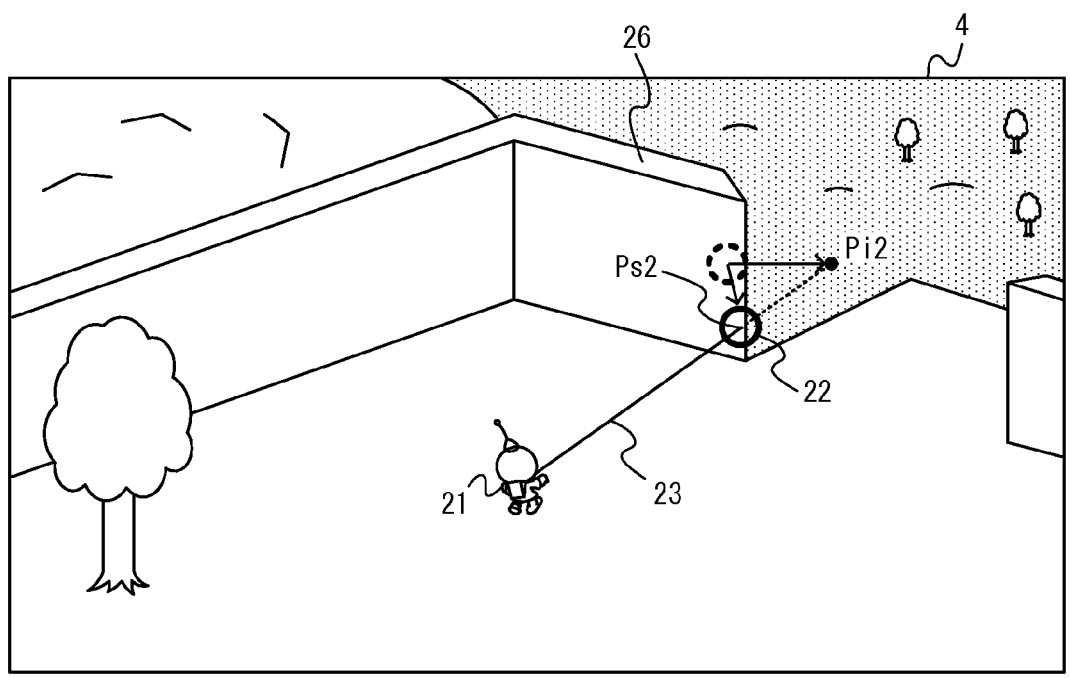
FIG. 4 is a diagram showing an example of a game image in the state after the specified position is moved from the state shown in FIG. 3.

FIG. 4 is a diagram showing an example of a game image in the state after the specified position is moved from the state shown in FIG. 3. As the input position Pi2 is calculated as described above, the information processing system 1 calculates the specified position based on the input position Pi2. Note that the specified position is calculated as a position in the virtual space. That is, the specified position is represented by three-dimensional coordinates specifying a position in the virtual space. Herein, in the present embodiment, the specified position is calculated so that the range condition and the distance condition to be defined below are satisfied.

Range condition: it be within a range on a line segment connecting between the position of the player character 21 and the input position on the screen.

Distance condition: the distance thereof from the player character 21 be within a predetermined distance in the virtual space Note that in the example shown in FIGS. 3 and 4, it is assumed that the ground 25 is away from the player character 21 by more than the predetermined distance, the position of the ground 25 does not satisfy the distance condition. Therefore, in this case, the specified position Ps2 satisfying the range condition and the distance condition is a position that is on the line segment extending from the position of the player character 21 to the input position Pi2 on the screen and that is not on the ground 25 in the virtual space. That is, as shown in FIG. 4, the specified position Ps2 is a position on the wall 26. Note that in the present embodiment, the specified position Ps2 is calculated to be a position away from the player character 21 on the line segment (details of which will be described later).

Although not shown in the example of FIGS. 3 and 4, where the input position satisfies the range condition and the distance condition, the information processing system 1 determines, as the specified position, a virtual-space position corresponding to the input position.

As described above, in the present embodiment, where the specified position is moved in response to the direction input of the user, the input position (a position in the virtual space corresponding thereto) may not, as it is, be the specified position. Specifically, in the present embodiment, the specified position is calculated taking the distance condition into consideration so that the specified position is not far away from the player character 21 with respect to the distance in the virtual space. Now, regarding the operation of moving the specified position, it may require some time when moving the specified position significantly, such as when the specified position is moved from the upper right corner to the lower left corner of the screen, for example. Therefore, since moving the specified position significantly takes some time, the user may feel that the controllability is poor. In contrast, according to the present embodiment, the range in which the specified position can be assumed is limited by the distance condition, and therefore circumstances are less likely to occur where the specified position needs to be moved significantly. Thus, the user can more comfortably control the specified position, thereby improving the controllability.

In the present embodiment, any area more distant from the player character 21 than a predetermined distance is excluded from the range in which the specified position can be assumed. It can be assumed that the user is unlikely to need to specify a position in such an area as the specified position, and it is believed that there is little or no inconvenience for the user even if a position in such an area cannot be specified as the specified position. It is believed that being unable to specify a position in such an area may rather be convenient for the user in some cases. Therefore, according to the present embodiment, it is possible to provide a control method with a good controllability with little or no inconvenience when performing a control operation.

In the present embodiment, using the range condition, the direction of the input position Pi2 and the direction of the specified position Ps2 as seen from the position of the player character 21 on the screen are equal to each other (see FIG. 4). This makes it possible to provide a control method with a good controllability, with which the user is unlikely to feel awkward, details of which will be described later.

As described above, the information processing system 1 calculates, as the specified position, based on the input position, a position that satisfies the distance condition and also satisfies the range condition. Therefore, the information processing system 1 provides advantageous effects described above, and it is possible to improve the controllability in the operation of specifying the specified position on the screen.

[3. Calculation of Specified Position]

Next, the details of the method for calculating the specified position will be described. Note that the following description will also be based on the same circumstances as those shown in FIGS. 3 and 4.

(3-1: Calculation of Input Position)

First, the details of the method for calculating the input position to be used for calculating the specified position will be described. The input position is calculated based on a direction-specifying input made on the stick 11. As described above, in the present embodiment, the new input position is calculated as a position obtained by moving the on-screen position corresponding to the current specified position based on the distance and the direction in accordance with the direction-specifying input.

As described above, in the present embodiment, the new input position is calculated based on the lastly-calculated specified position. That is, the information processing system 1 obtains input information from the direction input device (the stick 11), and calculates the new input position based on the input information so that it is a position obtained by moving the position of the lastly-calculated specified position on the screen in the direction indicated by the input information. Then, the new specified position is calculated based on the new input position. Thus, by determining the new input position as a position obtained by moving the previous specified position in the specified input direction, it is possible to calculate the input position in an easy-to-understand manner for the user.

Figure 5:
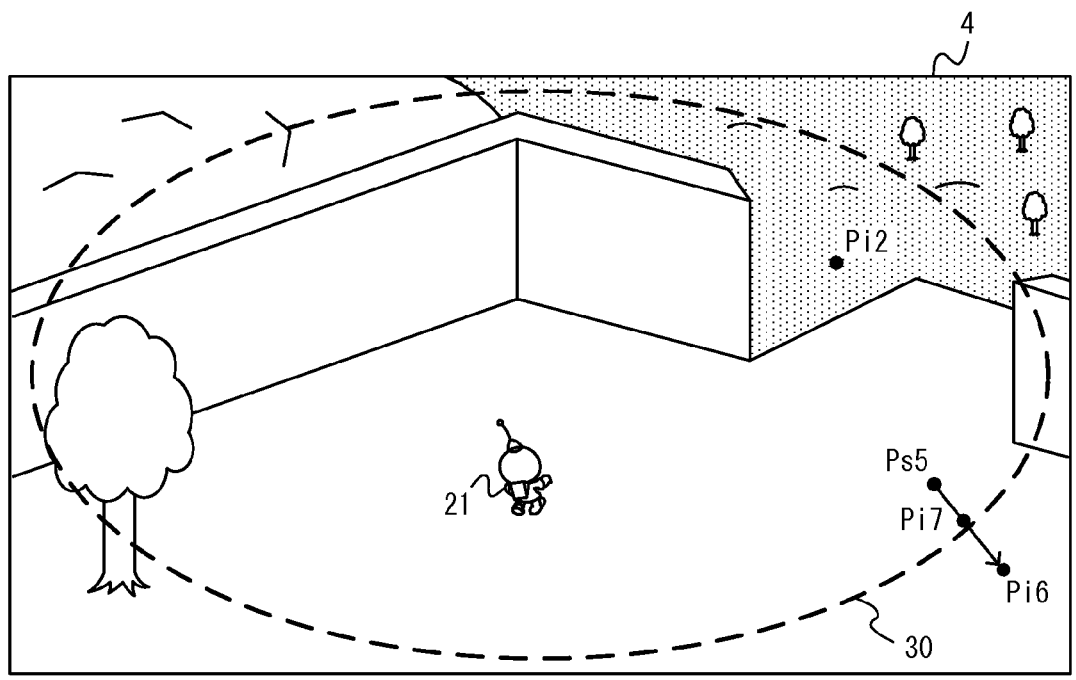
FIG. 5 is a diagram showing an example of a limit area for correcting the input position.

In the present embodiment, as the input position Pi2 is calculated based on the input of the user, the input position Pi2 is corrected so as to be located within a predetermined limit area on the screen. FIG. 5 is a diagram showing an example of a limit area for correcting the input position. As shown in FIG. 5, in the present embodiment, a limit area 30 is set on the screen. The limit area 30 may be set with respect to a predetermined position (e.g., a position at the center of the screen) on the screen, or may be set with respect to the on-screen position corresponding to the player character 21.

As the input position is calculated based on the input of the user, the information processing system 1 determines whether the input position is included within the limit area 30. Where the input position is within the limit area 30, as is the input position Pi2 shown in FIG. 5, the input position Pi2 is not corrected. On the other hand, where the input position is outside the limit area 30, the input position Pi2 is corrected so as to be included within the limit area 30. While any specific method may be used for the correction, the correction is done by the following method in the present embodiment. An example will now be described, in which the input position is calculated to be the input position Pi6 based on the input of the user in the state where the specified position Ps5 has been set as shown in FIG. 5. In this case, the corrected input position Pi7 is calculated to be a position that is on the line segment connecting between the latest specified position Ps5 and the uncorrected input position Pi6 and that is within the limit area 30.

As described above, in the present embodiment, since the input position is corrected to be within the limit area 30, the specified position on the screen to be calculated based on the input position will be a position within the limit area 30. That is, the information processing system 1 calculates the specified position so that the on-screen position corresponding to the specified position is within the limit area 30 on the screen. Then, the range in which the specified position can be assumed can be limited within the limit area 30 by a method different from the method using the distance condition. Therefore, circumstances are less likely to occur where the specified position needs to be moved significantly, and it is thus possible to better improve the controllability in the operation of specifying the specified position. Note that in other embodiments, the process of correcting the input position using the limit area 30 does not need to be performed.

(3-2: Calculation of Specified Position)

As the input position is corrected (as necessary) by the correction using the limit area 30, the information processing system 1 calculates the specified position based on the input position. As described above, the specified position is calculated so as to satisfy the distance condition and the range condition. Now, in the present embodiment, the information processing system 1 calculates candidate positions using a binary search method on a line segment connecting between the position (referred to as the "character position") Pc of the player character 21 and the input position Pi2 on the screen. Then, one of the candidate positions satisfying the distance condition is determined as the specified position. Now, the details of the method for calculating the specified position in the present embodiment will be described.

Figure 6:
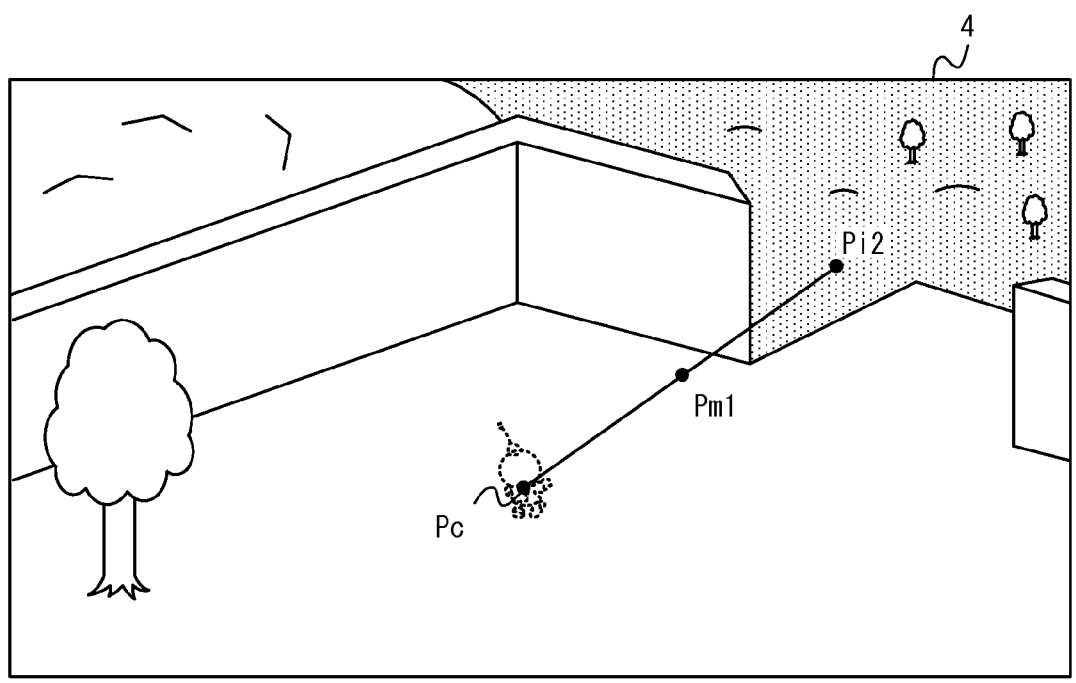
FIG. 6 is a diagram showing an example of a state where the specified position is being calculated.

FIG. 6 is a diagram showing an example of a state where the specified position is being calculated. In the present embodiment, first, the information processing system 1 sets a search range to be on the line segment extending from the character position Pc to the input position Pi2 on the screen, and calculates, as the $1^{st}$ candidate position, the position Pm1, which is the midpoint of the search range. Then, the information processing system 1 determines whether the position Pm1, which is the $1^{st}$ candidate position, satisfies the distance condition. That is, the information processing system 1 calculates the virtual-space position corresponding to the candidate position Pm1, and determines whether the distance from the position of the player character 21 to the calculated position is less than or equal to a predetermined distance.

Next, the information processing system 1 calculates the $2^{nd}$ candidate position based on the determination result for the $1^{st}$ candidate position Pm1. FIG. 7 is a diagram showing an example of a method for determining candidate positions. In the present embodiment, if the $1^{st}$ candidate position Pm1 satisfies the distance condition, the far half of the current search range with respect to the candidate position Pm1 (as seen from the character position Pc) is set as the new search range, and the midpoint of the new search range is set as the $2^{nd}$ candidate position Pm2. That is, in this case, the $2^{nd}$ candidate position Pm2 is determined to be the position of the midpoint between the $1^{st}$ candidate position Pm1 and the input position Pi2 ((a) shown in FIG. 7). On the other hand, if the $1^{st}$ candidate position Pm1 does not satisfy the distance condition, the near half of the current search range with respect to the candidate position Pm1 (as seen from the character position Pc) is set as the new search range, and the midpoint of the new search range is set as the $2^{nd}$ candidate position Pm2. That is, in this case, the $2^{nd}$ candidate position Pm2 is determined to be the position of the midpoint between the $1^{st}$ candidate position Pm1 and the character position Pc ((b) shown in FIG. 7). Note that as with the $1^{st}$ candidate position Pm1, it is determined whether the $2^{nd}$ candidate position Pm2 satisfies the distance condition.

In the present embodiment, until a predetermined termination condition is satisfied, the information processing system 1 repeats the process of determining a candidate position, and the decision process for the newly-determined candidate position (whether the candidate position satisfies the distance condition). Note that in the present embodiment, the termination condition is a condition that the determination process and the decision process be performed a predetermined number of times (e.g., seven times). If the termination condition is satisfied, the information processing system 1 determines, as the specified position, a virtual-space position corresponding to a lastly-calculated candidate position that satisfies the distance condition. That is, in the present embodiment, the specified position is the virtual-space position corresponding to one of the candidate positions satisfying the distance condition that is farthest away from the character position Pc.

Note that the method for calculating the $3^{rd}$ and subsequent candidate positions is similar to the method for calculating the $2^{nd}$ candidate position. That is, if the $n^{th}$ (n is an integer of 1 or more) candidate position Pm(n) satisfies the distance condition, the far half of the $n^{th}$ search range with respect to the candidate position Pm(n) is set as the new search range, and the midpoint of the new search range is set as the $(n+1)^{th}$ candidate position Pm(n+1). On the other hand, if the $n^{th}$ candidate position Pm(n) does not satisfy the distance condition, the near half of the $n^{th}$ search range with respect to the candidate position Pm(n) is set as the new search range, and the midpoint of the new search range is set as the $(n+1)^{th}$ candidate position Pm(n+1). For example, in the case of (a) shown in FIG. 7, if the $2^{nd}$ candidate position Pm2 satisfies the distance condition, the $3^{rd}$ candidate position Pm3 is determined to be the position of the midpoint between the $2^{nd}$ candidate position Pm2 ad the input position Pi2 ((c) shown in FIG. 7). On the other hand, if the $2^{nd}$ candidate position Pm2 does not satisfy the distance condition, the $3^{rd}$ candidate position Pm3 is determined to be the position of the midpoint between the $1^{st}$ candidate position Pm1 and the $2^{nd}$ input position Pi2 ((d) shown in FIG. 7).

The termination condition may be any condition. For example, in other embodiments, the termination condition may be a condition that the difference between a candidate position and another candidate position calculated next be less than or equal to a predetermined value. This difference may be based on the distance on the screen or the distance in the virtual space.

As described above, in the present embodiment, the information processing system 1 calculates, based on the input position, one or more candidate position satisfying the range condition (being on the line segment between the character position Pc and the input position Pi2). Then, a virtual-space position corresponding to one of the candidate positions satisfying the distance condition is determined as the specified position. Thus, it is possible to easily calculate the specified position satisfying the range condition and the distance condition.

In the present embodiment, the information processing system 1 repeatedly calculates the candidate position until a predetermined termination condition is satisfied, by using a binary search method for the reference position (the character position Pc) and the input position on the screen. Each time a candidate position is calculated, the information processing system 1 determines whether the candidate position satisfies the distance condition, and determines the specified position from among candidate positions satisfying the distance condition. Thus, by calculating the candidate positions using the binary search method, it is possible to efficiently determine the candidate positions and to efficiently perform the specified position calculation process.

Note that the method for calculating the specified position using candidate positions is not limited to the method using the binary search method as in the present embodiment. For example, in other embodiments, the information processing system 1 may set candidate positions at a predetermined interval on the line segment extending from the character position Pc to the input position Pi2 so as to make the decision for the distance condition for each candidate position. Then, the information processing system 1 may select, as the specified position, one of the candidate positions satisfying the distance condition (e.g., determine the candidate position farthest away from the character position Pc to be the specified position).

In the present embodiment, the specified position is determined to be the virtual-space position corresponding to one of the candidate positions satisfying the distance condition that is farthest away from the reference position (the position of the player character 21). Thus, the specified position is one of the candidate positions that is closest to the input position. Then, since the difference between the direction specified by the user and the direction in which the specified position moves can be kept small, it is possible to provide a control method with a good controllability, with which the user is unlikely to feel awkward.

Note that in other embodiments, the specified position may be calculated by a method that does not use candidate positions. For example, the information processing system 1 may determine, as the specified position, a position in the virtual space satisfying the range condition that is farthest away from the reference position in terms of the distance on the screen (and that satisfies the distance condition). Specifically, the information processing system 1 first calculates an area in the virtual space that satisfies the range condition and also satisfies the distance condition. Then, the information processing system 1 determines, as the specified position, a position in the calculated area that is farthest away from the reference position in terms of the distance on the screen. Also in this manner, the difference between the direction specified by the user and the direction in which the specified position moves can be kept small, as in the present embodiment. Note that in this process, the specified position does not need to be the "farthest position" in a strict sense. The specified position may be a position within the specified area that is near the farthest position from the reference position in terms of the distance on the screen (i.e., a position within a predetermined distance from the farthest position). Also in this manner, there is an advantageous effect that the difference between the direction specified by the user and the direction in which the specified position moves can be kept small, as in the present embodiment.

Note that in the present embodiment, when making the decision for the distance condition for the candidate position, the virtual-space position corresponding to the candidate position Pm1 is calculated to be a position displayed on the screen. That is, the information processing system 1 determines, as the candidate position, a position that is first contacted by a straight line extending from the position of the viewpoint when displaying the virtual space on the screen. Therefore, the specified position is one of positions in the virtual space that is displayed on the screen. Then, the specified position is a position displayed on the screen, and it is possible to display the specified position in an easy-to-understand manner for the user without the specified position being hidden by the object arranged in the virtual space.

(3-3: Range Condition)

As described above, in the present embodiment, the information processing system 1 uses, as the range condition, a condition that "the position be within a range on a line segment connecting between the position of the player character 21 and the input position on the screen". Now, the range condition may be any condition that the on-screen position corresponding to the specified position be within a range that is determined by the on-screen position corresponding to the reference position (the position of the player character 21) and the input position.

Now, in the present embodiment, the input position and the specified position may not correspond to each other (they do not coincide with each other on the screen), and the input direction specified by the user and the direction in which the specified position moves may not coincide with each other. For example, in the example shown in FIGS. 3 and 4, although a right-direction input is made on the stick 11, the pointer image 22 moves in the downward direction. Therefore, it may be difficult for the user to predict where the specified position is going to be moved, and the user may feel awkward with the behavior of the specified position.

For this, in the present embodiment, the information processing system 1 uses, as the range condition, a condition that "the on-screen position corresponding to the specified position be within a predetermined range between the on-screen position corresponding to the reference position and the input position". Then, since the specified position is in the range between the reference position and the input position, the direction of the input position and the direction of the specified position as seen from the reference position are generally equal to each other. Therefore, the user is unlikely to feel awkward even if the input position and the specified position are not the same position on the screen, and it is thus possible to provide a control method with a good controllability.

Note that the range condition in the present embodiment is a range condition where the predetermined range is the range on the line segment connecting between the character position Pc and the input position Pi2. That is, the range condition in the present embodiment is a condition that the on-screen position corresponding to the specified position be located on the line segment connecting between the on-screen position corresponding to the reference position and the input position. Then, it is possible to easily calculate the specified position from the line segment.

Note that the predetermined range may be set, for example, as a range within a predetermined distance from the line segment connecting between the character position Pc and the input position Pi2. Then, the specified position may possibly be a position slightly off the line segment. Therefore, in some cases, the specified position can be a position that is closer to the input position Pi2 in terms of the distance on the screen, thereby making it even less likely that the user may feel awkward.

(3-4: Distance Condition)

As described above, in the present embodiment, the information processing system 1 uses, as the distance condition, a condition that "the distance from the player character 21 be within a predetermined distance in the virtual space". Then, the range in which the specified position can be assumed can easily be limited to a range that is within a predetermined distance from the player character 21.

In the present embodiment, the information processing system 1 may use the distance on a predetermined plane (e.g., a plane parallel to the ground) in the virtual space, as "the distance from the reference position to the specified position" in the virtual space. That is, the information processing system 1 may calculate the specified position using, as the distance condition, a condition that the distance with respect to a predetermined plane in the virtual space be within a predetermined distance from the reference position. Then, the information processing system 1 makes the decision for the distance condition while neglecting the length in the direction perpendicular to the predetermined plane. For example, where the ground is the predetermined plane, a position with a difference in level (with a difference in the height direction) from the position of the player character 21 can be used as the specified position.

The distance condition may be any condition regarding the distance from a predetermined reference position in the virtual space. While the reference position is the position of the player character 21 in the present embodiment, the reference position may be another position in other embodiments. For example, the virtual-space position corresponding to the center of the screen may be set as the reference position, or a position determined by the user may be set as the reference position.

While the present embodiment uses a condition that the specified position be within a predetermined distance from the reference position, the distance condition is not limited to this in other embodiments. For example, in other embodiments, the information processing system 1 may scan along the line segment connecting between the character position Pc and the input position Pi2 starting from the character position Pc to identify a point at which "the distance from the reference position (in the virtual space)" changes abruptly (the amount of change becomes greater than or equal to a predetermined value), so that a position slightly before the identified position may be set as the specified position. For example, in the example shown in FIG. 3, along the line segment connecting between the player character 21 and the input position Pi2, "the distance from the reference position" changes abruptly at a position in the virtual space where it transitions from the wall 26 to the ground 25. Thus, also with the method described above, it is possible to obtain the position of the wall 26 the specified position as the specified position, as in the present embodiment. Thus, the distance condition may be a condition regarding the amount of change in the distance from the reference position.

(3-5: Valid Area)

Next, the valid area used in the present embodiment for calculating the specified position will be described. In the present embodiment, the information processing system 1 does only simply use the distance condition, but uses a distance condition determined while taking the valid area into consideration depending on the game status. The valid area is an area set on the screen (on a plane corresponding to the screen), and a position can be the specified position if it is within the valid area even if it does not satisfy the distance condition described above in "(2-2: Outline of control of specified position)", details of which will be described later.

Figure 8:
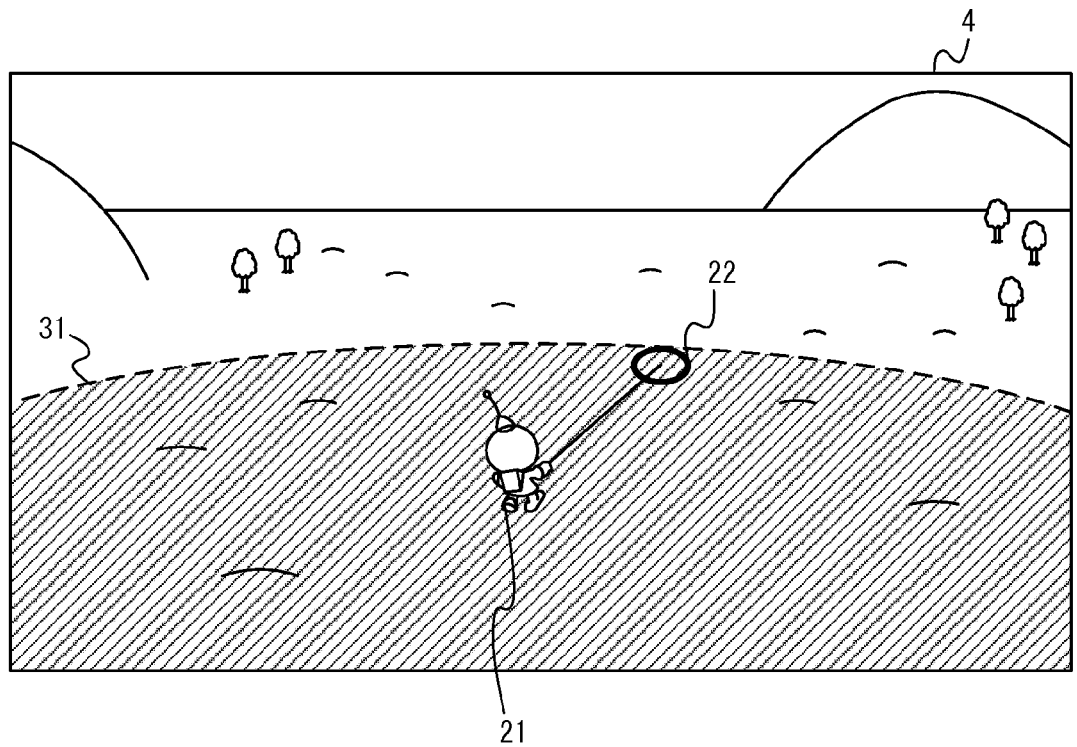
FIG. 8 is a diagram showing an example of a range in which the distance condition is satisfied.

FIG. 8 is a diagram showing an example of a range in which the distance condition is satisfied. Since the distance condition is a condition "the specified position be within a predetermined distance from the player character 21" as described above, a range of the virtual space displayed on the screen that satisfies the distance condition is the range of an area 31 (the hatched area in FIG. 8) in the example shown in FIG. 8. Now, in FIG. 8, the angle of depression of the slight line (the sight line of the virtual camera) for displaying the virtual space with respect to the ground is smaller than in FIG. 3. Therefore, the area 31 is not so much expanding in front of the player character 21 (on the upper side on the screen) as seen on the screen. In the example shown in FIG. 8, even though the ground is substantially flat and the ground is spreading very far in front of the player character 21, the specified position cannot be moved over a wide range in front of the player character 21. Therefore, the user may not be able to move the specified position sufficiently, and may feel it difficult to control the specified position.

Figure 9:
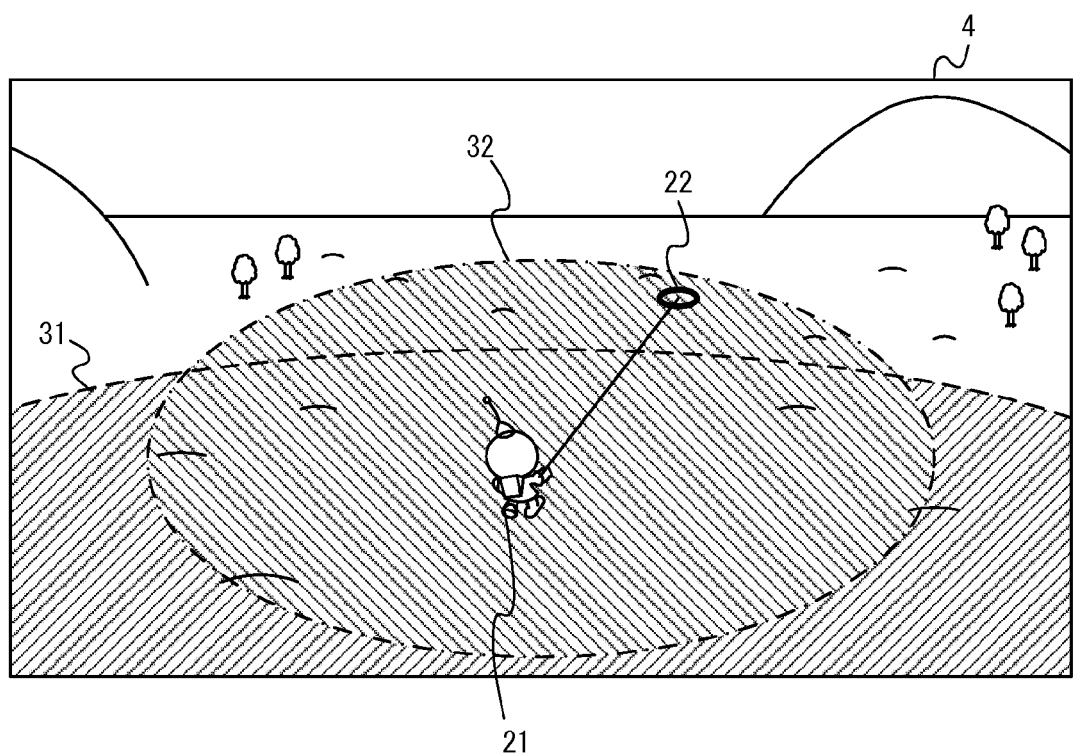
FIG. 9 is a diagram showing an example of a valid area.

In view of this, in the present embodiment, if the angle of depression of the virtual camera is less than or equal to a predetermined angle, the information processing system 1 sets a valid area. FIG. 9 is a diagram showing an example of a valid area. In FIG. 9, a valid area 32 is set on the screen. Although the valid area 32 may be set to be of any range, it is set in the present embodiment with respect to the on-screen position corresponding to the reference position (the position of the player character 21). That is, an elliptical area centered about the player character 21 is set as the valid area 32. Note that the valid area 32 is set so as to be smaller than the limit area 30 (i.e., so that the valid area 32 is included within the limit area 30).

Where the valid area 32 is set, the information processing system 1 calculates the specified position using the distance condition determined while taking the valid area 32 into consideration. That is, even if a position in the virtual space is not within a predetermined distance from the player character 21, the position is determined to satisfy the distance condition if it is included within the valid area 32 on the screen. Therefore, the specified position can be moved within the valid area 32. FIG. 10 is a diagram showing an example of the area 31 and the valid area 32 shown in FIG. 9 as seen from directly above. As shown in FIGS. 9 and 10, by setting the valid area 32, the user can specify a position as the specified position over a larger range in front of the player character 21.

Where the valid area 32 is set, the distance condition used in the specified position calculation process is a condition "that the on-screen position corresponding to the specified position be within the valid area, or that the specified position be within a predetermined distance from the position of the player character in the virtual space". That is, the determination whether a candidate position satisfies the distance condition differs from that in a case where no valid area 32 is set. More specifically, when the on-screen position corresponding to the candidate position is within the valid area 32, the information processing system 1 determines that the distance condition is satisfied. Also when the candidate position is within a predetermined distance from the player character 21, it is determined that the distance condition is satisfied. On the other hand, if the on-screen position corresponding to the candidate position is not within the valid area 32 and if the candidate position is not within a predetermined distance from the player character 21, it is determined that the distance condition is not satisfied. Note that the same method for calculating the candidate position is used both when the valid area 32 is set and when no valid area 32 is set.

As described above, the present embodiment uses the distance condition determined while taking the valid area 32 into consideration (under a predetermined condition). That is, the information processing system 1 calculates the specified position by using, as the distance condition, a condition that the on-screen position corresponding to the specified position be within the valid area 32 set with respect to the on-screen position corresponding to the reference position (the position of the player character 21) or that the specified position be within a predetermined distance from the reference position in the virtual space. Then, over the range within the valid area 32, a position can be specified as the specified position, irrespective of the distance thereof in the virtual space. Thus, it is possible to further improve the controllability in the operation of moving the specified position.

Note that in the present embodiment, the information processing system 1 sets the valid area 32 if the angle of depression of the virtual camera for displaying the virtual space on the screen is less than or equal to a predetermined angle, and does not set the valid area 32 if the angle of depression is greater than the predetermined angle. Now, the condition for determining whether or not to set the valid area 32 (whether or not to use the distance condition determined while taking the valid area 32 into consideration) may be any condition. For example, the information processing system 1 may determine whether or not to set the valid area 32 based on an instruction from the user. Alternatively, it may be determined whether or not to set the valid area 32 based on the state of the player character (e.g., the action, etc., of the player character to be executed at the specified position). In other embodiments, the valid area 32 may always be set or may always not be set.

While the position and the size of the valid area 32 are fixed on the screen in the present embodiment, the position and/or the size of the valid area 32 may be variable in other embodiments. For example, in other embodiments, the information processing system 1 may change the position and/or the size of the valid area 32 based on the state of the player character (e.g., the action, etc., of the player character to be executed at the specified position). For example, the valid area 32 may be set smaller when the player character 21 is ready to use an item that can only be used near the player character 21, and the valid area 32 may be set larger when the player character 21 is ready to use an item that can be used at a position away from the player character 21.

[4. Specific Example of Specified Position Calculation Process]

Figure 11:
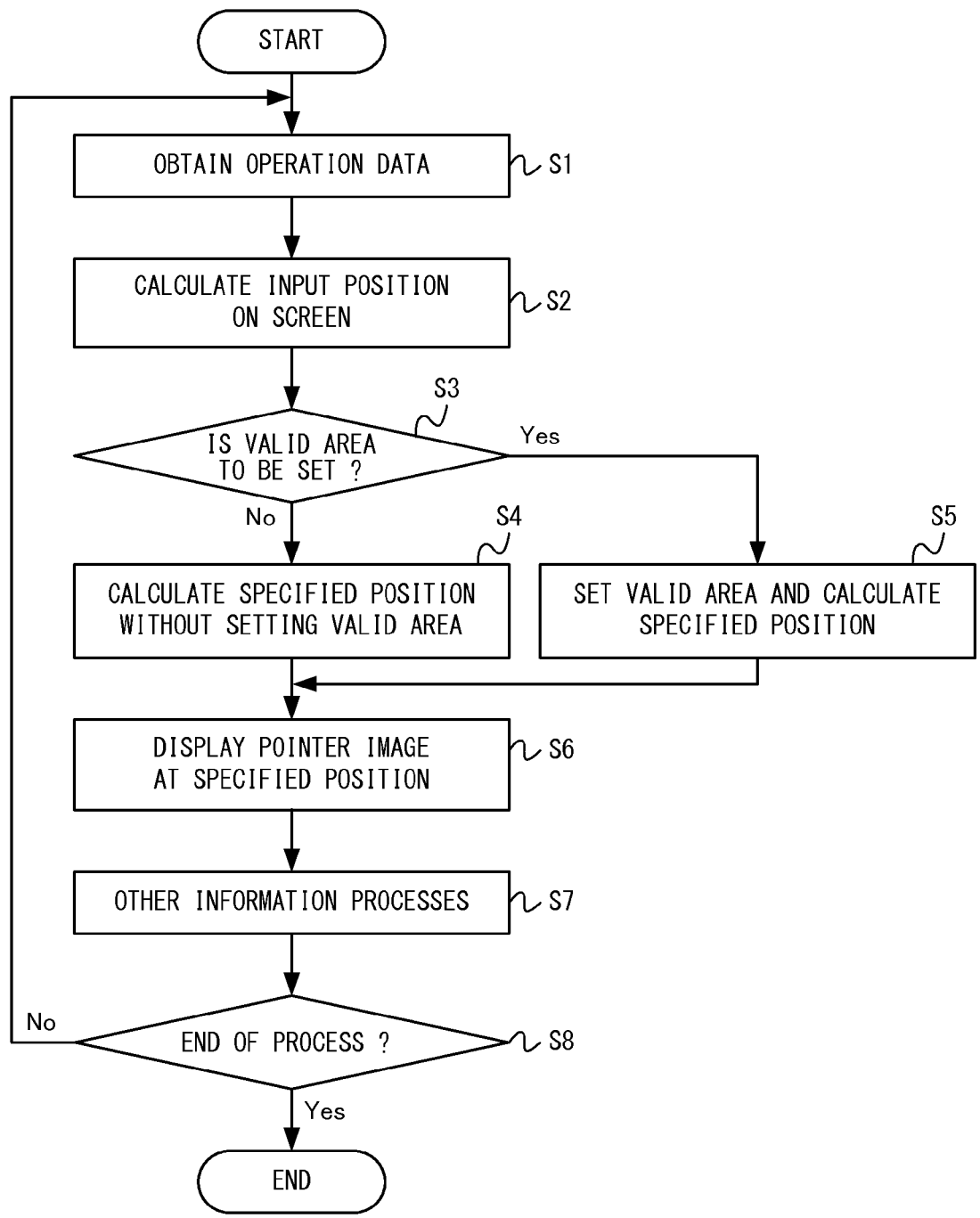
FIG. 11 is a flow chart showing an example of the flow of a specified position calculation process performed by an information processing device (CPU) in the present embodiment.

A specific example of the specified position calculation process to be performed in the information processing system 1 (the information processing device 3) in the present embodiment will be described. FIG. 11 is a flow chart showing an example of the flow of a specified position calculation process performed by the information processing device 3 (the CPU 14) in the present embodiment. In the present embodiment, a series of processes shown in FIG. 11 is performed as the CPU 14 executes an information processing program stored in the program storing section 16.

The specified position calculation process shown in FIG. 11 may be started at any appropriate point in time. In the present embodiment, it is assumed that the information processing program is a part of a predetermined game program. Then, the specified position calculation process shown in FIG. 11 may be started in response to the user instructing to start executing the game program, for example. At an appropriate point in time, part or whole of the information processing program (game program) is loaded onto the memory 15 and executed by the CPU 14. Thus, the series of processes shown in FIG. 11 is started. Note that it is assumed that the information processing program is pre-stored in the program storing section 16 in the information processing device 3. Note however that in other embodiments, the information processing program may be obtained from a storage medium that can be attached/removed to/from the information processing device 3 to be stored in the memory 15, or may be obtained from another device via a network, such as the Internet, to be stored in the memory 15.

Note that the processes of the steps of the flow chart shown in FIG. 11 are merely illustrative, and the order of steps to be performed may be switched around, or other processes may be performed in addition to (or instead of) the processes of these steps, as long as similar results are obtained. While the present embodiment is described assuming that the processes of the steps of the flow chart are performed by the CPU, processes of some of the steps of the flow chart may be performed by a processor or a dedicated circuit other than the CPU.

In the specified position calculation process, first, in step S1, the CPU 14 obtains operation data. That is, the CPU 14 receives operation data including data of the output value of the stick 11 from the input device 2, and stores the received operation data in the memory 15. The process of step S2 is performed, following step S1.

In step S2, the CPU 14 calculates the input position based on the operation data obtained in step S1. In the present embodiment, the input position is calculated according to the method described above in "(2-2: Outline of control of specified position)" and "(3-1: Calculation of input position)". The CPU 14 reads out the operation data from the memory 15, and stores data representing an input position calculated based on the operation data in the memory 15. The process of step S3 is performed, following step S2.

In step S3, the CPU 14 determines whether or not to set a valid area. Specifically, it is determined whether the angle of depression of the viewing direction of the virtual camera is less than or equal to a predetermined angle. Note that the viewing direction of the virtual camera is set/changed in the process of step S7 to be described below. If the determination result of step S3 is negative, the process of step S4 is performed. On the other hand, if the determination result of step S3 is affirmative, the process of step S5 is performed.

In step S4, the CPU 14 calculates the specified position without setting the valid area. That is, the specified position is calculated according to the method described above in "(3-2: Calculation of specified position)". As a specific process, the CPU 14 calculates the specified position based on the data of the input position read out from the memory 15, and stores the data representing the calculated specified position in the memory 15. The process of step S6 to be described below is performed, following step S4.

In step S5, the CPU 14 sets the valid area and calculates the specified position. That is, the specified position is calculated according to the method described above in "(3-2: Calculation of specified position)" and "(3-5: Valid area)". As a specific process, the CPU 14 calculates the specified position based on the data of the input position read out from the memory 15, and stores the data representing the calculated specified position in the memory 15. The process of step S6 to be described below is performed, following step S5.

In step S6, the CPU 14 displays an image representing the specified position. Specifically, the CPU 14 arranges an object representing a pointer image at the specified position in the virtual space, and arranges a line object extending from the player character 21 to the specified position. Thus, the pointer image 22 and the line 23 are displayed on the screen through the display process (step S7) to be described below. The process of step S7 to be described below is performed, following step S6.

In step S7, the CPU 14 performs other information processes (game operations other than the processes of steps S1 to S6). For example, other information processes include the process of controlling the action of the player character 21 according to an input by the user, the process of controlling the action of characters other than the player character 21 according to a predetermined algorithm, the process of controlling the position (viewpoint) and the attitude (viewing direction) of the virtual camera, and the process of generating a game image based on the virtual camera and displaying the game image on the television 4. The process of step S8 is performed, following step S7.

In step S8, the CPU 14 determines whether or not to end the specified position calculation process. The specific method for this determination may be any method. For example, the CPU 14 determines to end the specified position calculation process when there is an instruction from the user to end the execution of the game program, and determines not to end the control position calculation operation when there is no such an instruction from the user. If the determination result of step S8 is negative, the process of step S1 is performed again. Thereafter, the processes of steps S1 to S8 are performed repeatedly until it is determined in step S8 to end the control position calculation operation. On the other hand, if the determination result of step S8 is affirmative, the CPU 14 ends the specified position calculation process shown in FIG. 11.

[5. Variations]

(Variation Regarding Information Process Based on Specified Position)

In the present embodiment, the process of displaying an image representing the specified position (arranging an object representing the specified position) is performed as an example of an information process based on the specified position calculated by the method described above. Now, the information process based on the specified position may be any information process. For example, in other embodiments, the image representing the specified position does not need to be displayed, and the information processing system 1 may perform a process of making an object arranged in the virtual space execute an action against the specified position (e.g., an action of moving to the specified position, or an action of firing at the specified position).

While the present embodiment is directed to a case where the specified position calculation process is used for a game operation for allowing the game to progress, the specified position calculation process of the present embodiment may be used for any information process other than the game operation.

(Variation Regarding Input Device)

The embodiment described above is directed to a case where the input position is calculated based on an input on a direction input device (the stick 11) capable of accepting direction inputs. In other embodiments, the input position may be calculated based on an input on a different type of an input device from the direction input device. For example, in other embodiments, the information processing system 1 may calculate, as the input position, a position specified by a pointing device (a touch panel, a mouse, or the like).

As described above, the present embodiment is applicable to game devices, game systems, game programs, etc., for example, with the aim of improving the controllability in the operation of specifying the specified position, for example.

While certain example systems, methods, devices and apparatuses have been described herein, it is to be understood that the appended claims are not to be limited to the systems, methods, devices and apparatuses disclosed herein, but on the contrary, are intended to cover various improvements and modifications without departing from the spirit and scope of the appended claims.

What is claimed is:

1. An information processing device for calculating a specified position in a three-dimensional virtual space displayed on a screen of a display device, comprising:

an input position calculation section for calculating a two-dimensional input position on the screen based on a direction input of a user made on a direction input section; and a specified position calculation section for calculating, as the specified position, a position on a straight line connecting together a player object and the input position on the screen, wherein the position is within a predetermined distance from the player object in the virtual space, wherein the direction input section is at least one of a stick, a slide pad, a cross-shaped key, and/or a mouse, and an area of the virtual space that is more than the predetermined distance is displayed on the screen of the display device along with the virtual space that is within the predetermined distance from the player object.

2. A computer-readable non-transitory storage medium storing an information processing program to be executed by a computer of an information processing device for calculating a specified position in a three-dimensional virtual space displayed on a screen of a display device, the information processing program causing the computer to execute:

calculating a two-dimensional input position on the screen based on an input of a user; and calculating, as the specified position, based on the input position, a three-dimensional position satisfying a distance condition regarding a distance from a predetermined reference position in the virtual space, wherein the three-dimensional position satisfies a range condition that an on-screen position corresponding to the three-dimensional position be within a range determined by an on-screen position corresponding to the predetermined reference position and the input position.

3. The storage medium according to claim 2, wherein the specified position is calculated using, as the range condition, a condition that an on-screen position corresponding to the specified position be within a predetermined range between the on-screen position corresponding to the predetermined reference position and the input position.

4. The storage medium according to claim 3, wherein the specified position is calculated using, as the range condition, a condition that the on-screen position corresponding to the specified position be located on a line segment connecting between the on-screen position corresponding to the predetermined reference position and the input position.

5. The storage medium according to claim 2, wherein the specified position is calculated using, as the distance condition, a condition that the specified position be within a predetermined distance from the predetermined reference position in the virtual space.

6. The storage medium according to claim 5, wherein the specified position is calculated using, as the distance condition, a condition that a distance of the specified position regarding a predetermined plane in the virtual space be within a predetermined distance from the predetermined reference position.

7. The storage medium according to claim 2, wherein the specified position is calculated so that an on-screen position corresponding to the specified position is within a predetermined limit area on the screen.

8. The storage medium according to claim 2, wherein:

the information processing device obtains input information from a direction input device;

a new input position is calculated based on the input information so that the input position is obtained by moving a position of a lastly-calculated specified position on the screen in a direction represented by the input information; and a new specified position is calculated based on the new input position.

9. The storage medium according to claim 2, wherein:

one or more positions satisfying the range condition on the screen are calculated as candidate positions based on the input position; and a virtual-space position corresponding to one of the candidate positions satisfying the distance condition is determined as the specified position.

10. The storage medium according to claim 9, wherein a virtual-space position corresponding to one of the candidate positions satisfying the distance condition that is farthest away from the predetermined reference position is determined as the specified position.

11. The storage medium according to claim 9, wherein:

candidate positions are repeatedly calculated until a predetermined condition is satisfied by using a binary search method on the predetermined reference position and the input position on the screen; and it is determined whether the distance condition is satisfied each time a candidate position is calculated, and the specified position is determined from the candidate positions satisfying the distance condition.

12. The storage medium according to claim 2, wherein the specified position is one of the three-dimensional positions satisfying the range condition that satisfies the distance condition and is in the vicinity of a position farthest away from the predetermined reference position in terms of a distance on the screen.

13. The storage medium according to claim 2, wherein the specified position is calculated by using, as the distance condition, a condition that an on-screen position corresponding to the specified position be within a predetermined area set with respect to the on-screen position corresponding to the predetermined reference position or that the specified position be within a predetermined distance from the predetermined reference position in the virtual space.

14. The storage medium according to claim 2, wherein the specified position is one of positions in the virtual space that is displayed on the screen.

15. An information processing device for calculating a specified position in a three-dimensional virtual space displayed on a screen of a display device, the information processing device comprising:

an input position calculation section for calculating a two-dimensional input position on the screen based on an input of a user; and a specified position calculation section for calculating, as the specified position, based on the input position, a three-dimensional position satisfying a distance condition regarding a distance from a predetermined reference position in the virtual space, wherein the three-dimensional position satisfies a range condition that an on-screen position corresponding to the three-dimensional position be within a range determined by an on-screen position corresponding to the predetermined reference position and the input position.

16. An information processing system for calculating a specified position in a three-dimensional virtual space displayed on a screen of a display device, the information processing system comprising:

an input position calculation section for calculating a two-dimensional input position on the screen based on an input of a user; and a specified position calculation section for calculating, as the specified position, based on the input position, a three-dimensional position satisfying a distance condition regarding a distance from a predetermined reference position in the virtual space, wherein the three-dimensional position satisfies a range condition that an on-screen position corresponding to the three-dimensional position be within a range determined by an on-screen position corresponding to the predetermined reference position and the input position.

17. A method for calculating a specified position to be carried out by an information processing device for calculating a specified position in a three-dimensional virtual space displayed on a screen of a display device, the method comprising:

calculating a two-dimensional input position on the screen based on an input of a user; and calculating, as the specified position, based on the input position, a three-dimensional position satisfying a distance condition regarding a distance from a predetermined reference position in the virtual space, wherein the three-dimensional position satisfies a range condition that an on-screen position corresponding to the three-dimensional position be within a range determined by an on-screen position corresponding to the predetermined reference position and the input position.

* * * * *